US009821697B2

(12) United States Patent
Jaradi et al.

(10) Patent No.: US 9,821,697 B2
(45) Date of Patent: Nov. 21, 2017

(54) INFLATABLE CUSHION DISPOSED BETWEEN FRONT AND REAR SEATS OF A VEHICLE

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/013,688

(22) Filed: Feb. 2, 2016

(65) Prior Publication Data

US 2017/0217351 A1 Aug. 3, 2017

(51) Int. Cl.
*B60N 3/06* (2006.01)
*B60N 3/00* (2006.01)

(52) U.S. Cl.
CPC ............. *B60N 3/063* (2013.01); *B60N 3/008* (2013.01)

(58) Field of Classification Search
CPC ........ B60N 2/4495; B60N 3/06; B60N 3/063; B60N 3/008
USPC ......................................... 296/64, 65.01, 75
See application file for complete search history.

(56) References Cited

U.S. PATENT DOCUMENTS

| 2,837,145 | A | * | 6/1958 | Goetz | A47C 7/383 |
| | | | | | 297/DIG. 1 |
| 4,955,658 | A | | 9/1990 | Graves | |
| 5,639,141 | A | * | 6/1997 | Hanemaayer | B60N 2/062 |
| | | | | | 296/156 |
| 6,241,301 | B1 | | 6/2001 | Speth et al. | |
| 6,474,728 | B1 | * | 11/2002 | Mendis | B60K 23/00 |
| | | | | | 296/190.08 |
| 9,096,150 | B2 | | 8/2015 | Cuddihy et al. | |

FOREIGN PATENT DOCUMENTS

| DE | 29812816 U1 | 12/1998 |
| DE | 102006006362 A1 | 5/2007 |
| DE | 102013005075 A1 | 9/2014 |
| EP | 2781402 A1 | 9/2014 |

OTHER PUBLICATIONS

English translation of DE 10 2013 005 075; retreived on Dec. 21, 2016 via PatentTranslate located at www.epo.org.*

* cited by examiner

*Primary Examiner* — Jason S Daniels
(74) *Attorney, Agent, or Firm* — Frank A. MacKenzie; Bejin Bieneman PLC

(57) ABSTRACT

A vehicle includes a floor, a rear seat, and a front seat rotatable relative to the rear seat from a first position facing the rear seat to a second position facing away from the rear seat. An inflatable cushion is supported by the floor and is disposed between the front seat and the rear seat. A pressure control device is in communication with the inflatable cushion. The inflatable cushion may be used by an occupant of the vehicle as a footrest and/or a bed.

17 Claims, 7 Drawing Sheets

INFLATABLE CUSHION DISPOSED BETWEEN FRONT AND REAR SEATS OF A VEHICLE

BACKGROUND

An autonomous vehicle may be autonomously operated, allowing occupants of the vehicle to ride in the vehicle without monitoring the operation of the vehicle. Specifically, the autonomous vehicle may include a front row of seats and a rear row of seats, and the occupants seated in a front row of seats of the vehicle may be free to rotate the front seats to face rearward during operation of the vehicle. This may allow the occupants of the front row of seats to face the occupants of the rear row of seats. This may also allow all occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

Figure 1:
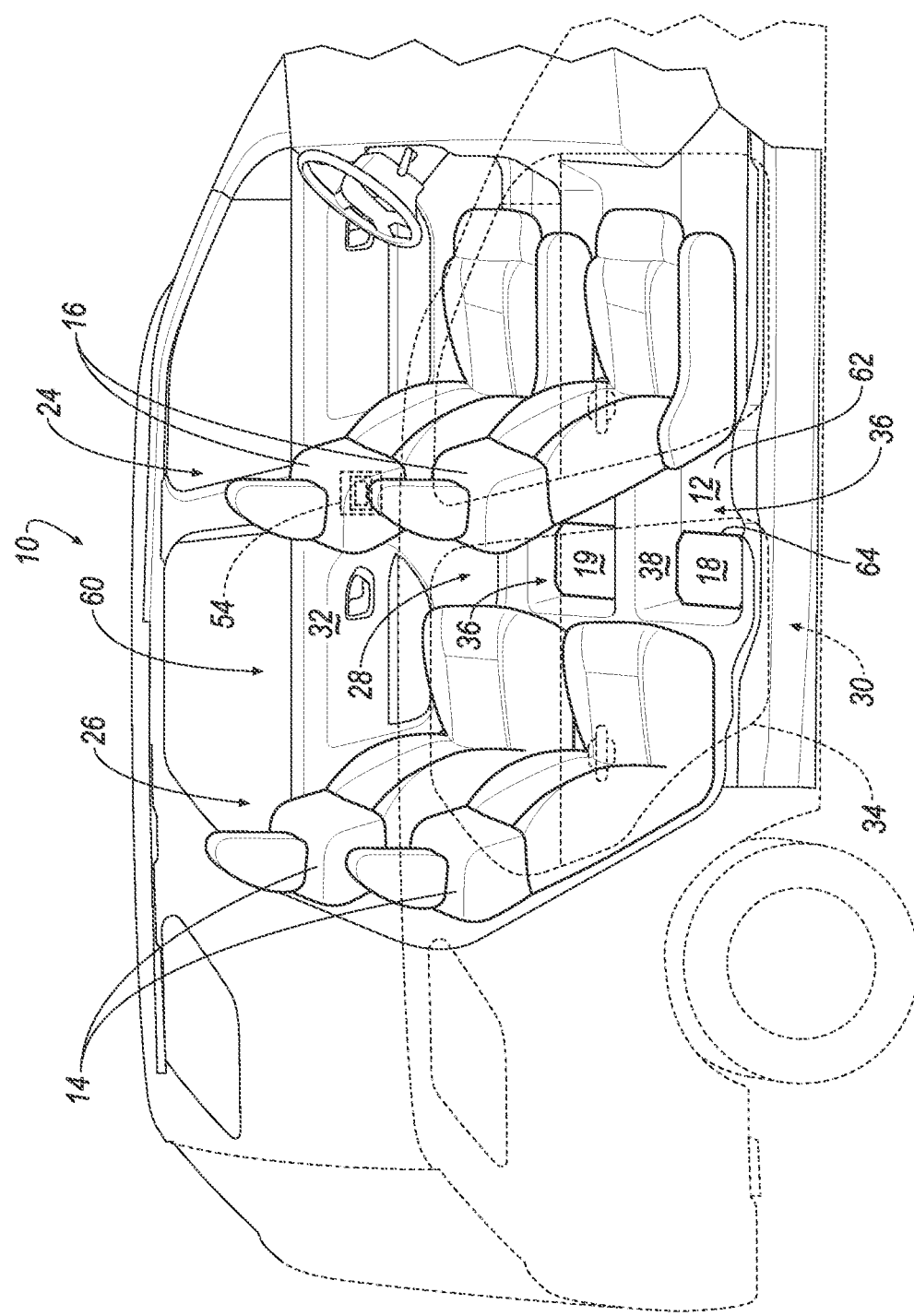
FIG. 1 is a perspective view of a vehicle including two inflatable cushions in a deflated position between front seats and rear seats.

With reference to the figures, wherein like numerals indicate like parts throughout the several views, a vehicle 10 includes a floor 12, a rear seat 14, and a front seat 16. The front seat 16 is rotatable relative to the rear seat 14 from a first position facing away from the rear seat 14 to a second position facing toward the rear seat 14. An inflatable cushion 18, 19 20 supported by the floor 12 is disposed between the front seat 16 and the rear seat 14. A pressure control device 22 is in communication with the inflatable cushion 18, 19, 20.

Figure 2:
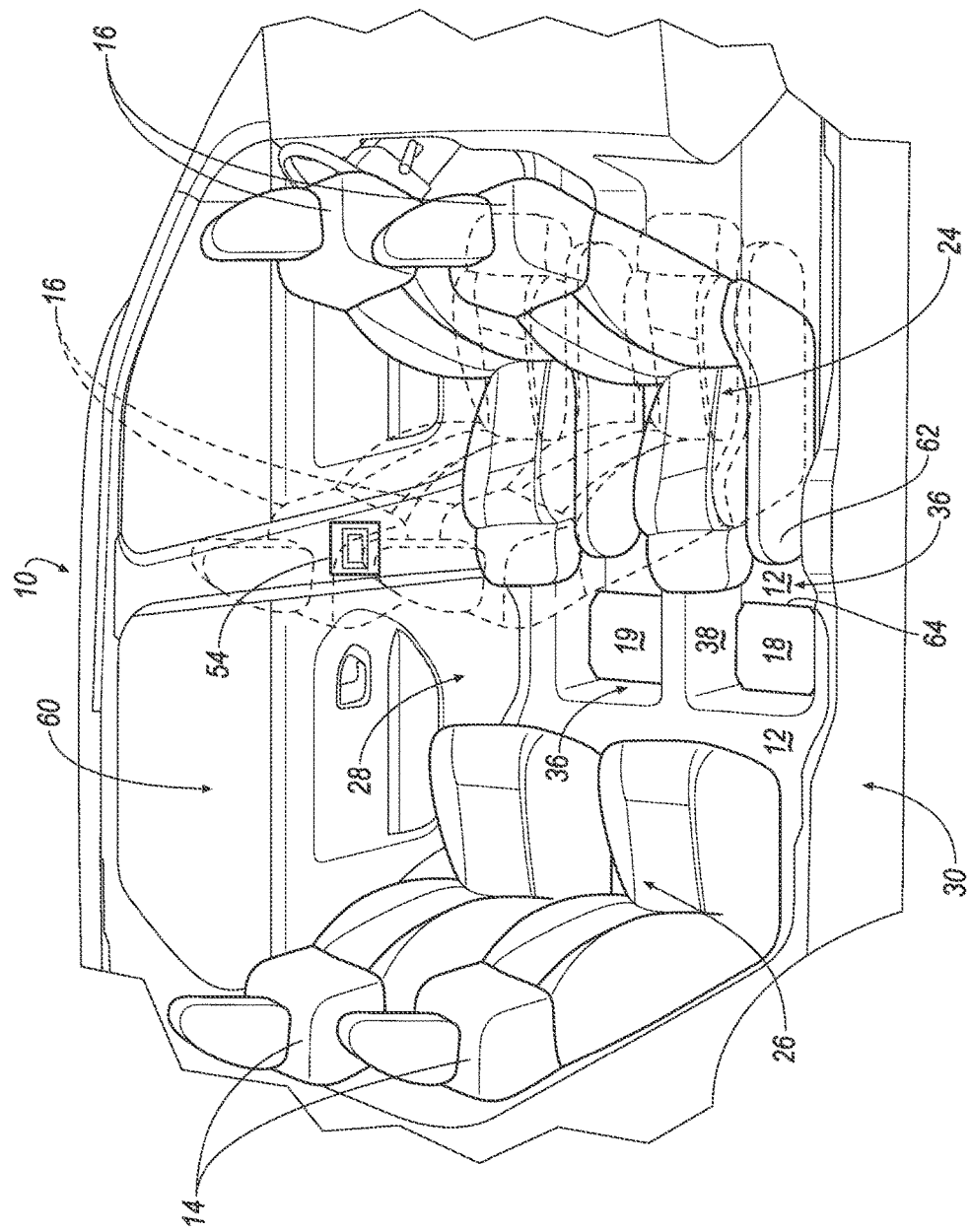
FIG. 2 is a perspective view of the vehicle of FIG. 1 with the front seats rotated to face rearward.

The inflatable cushion 18, 19, 20 may be repeatedly and selectively inflated and deflated by the occupant. For example, the occupant may deflate the inflatable cushion 18, 19, 20, as shown in FIGS. 1 and 2, if the occupant chooses to position the legs of the occupant in an upright position. Alternatively, the occupant may inflate the inflatable cushion 18, 19, 20 if the occupant chooses to use the inflatable cushion 18, 19, 20 as a footrest and/or a bed. As set forth below, the occupant may choose when to inflate and deflate the inflatable cushion 18, 19, 20.

As one example, as set forth above, an occupant of the rear seat 14 may inflate the inflatable cushion 18, 19, 20 for use as a footrest. In another example, when the vehicle 10 is operated in an autonomous mode, an occupant seated in the front seat 16 may rotate the front seat 16 about a vertical axis and may use the inflatable cushion 18, 19, 20 as a footrest. Specifically, the occupant seated in the front seat 16 may rotate the front seat 16 from the first position, e.g., facing away from the rear seat 14 in a vehicle-forward direction, to the second position, e.g., facing toward the rear seat 14 in a vehicle-rearward direction, in which the occupant of the front seat 16 may utilize the inflatable cushion 18, 19, 20. In other words, when the front seat 16 is rotated in the second position, occupants in the front seat 16 and the rear seat 14 are facing each other and may both use the inflatable cushion 18, 19, 20 as a footrest. Because the front seat 16 is rotatable and because the inflatable cushion 18, 19, 20 may be used by both the occupants of the front seat 16 and the rear seat 14, the occupant of the front seat 16 may have a more comfortable ride and may better interact with the occupant of the rear seat 14 when utilizing the inflatable cushion 18, 19, 20. In addition to, or in the alternative to operation as a footrest, the inflatable cushion 18, 19, 20 may operate as a bed, as discussed further below.

Figure 3:
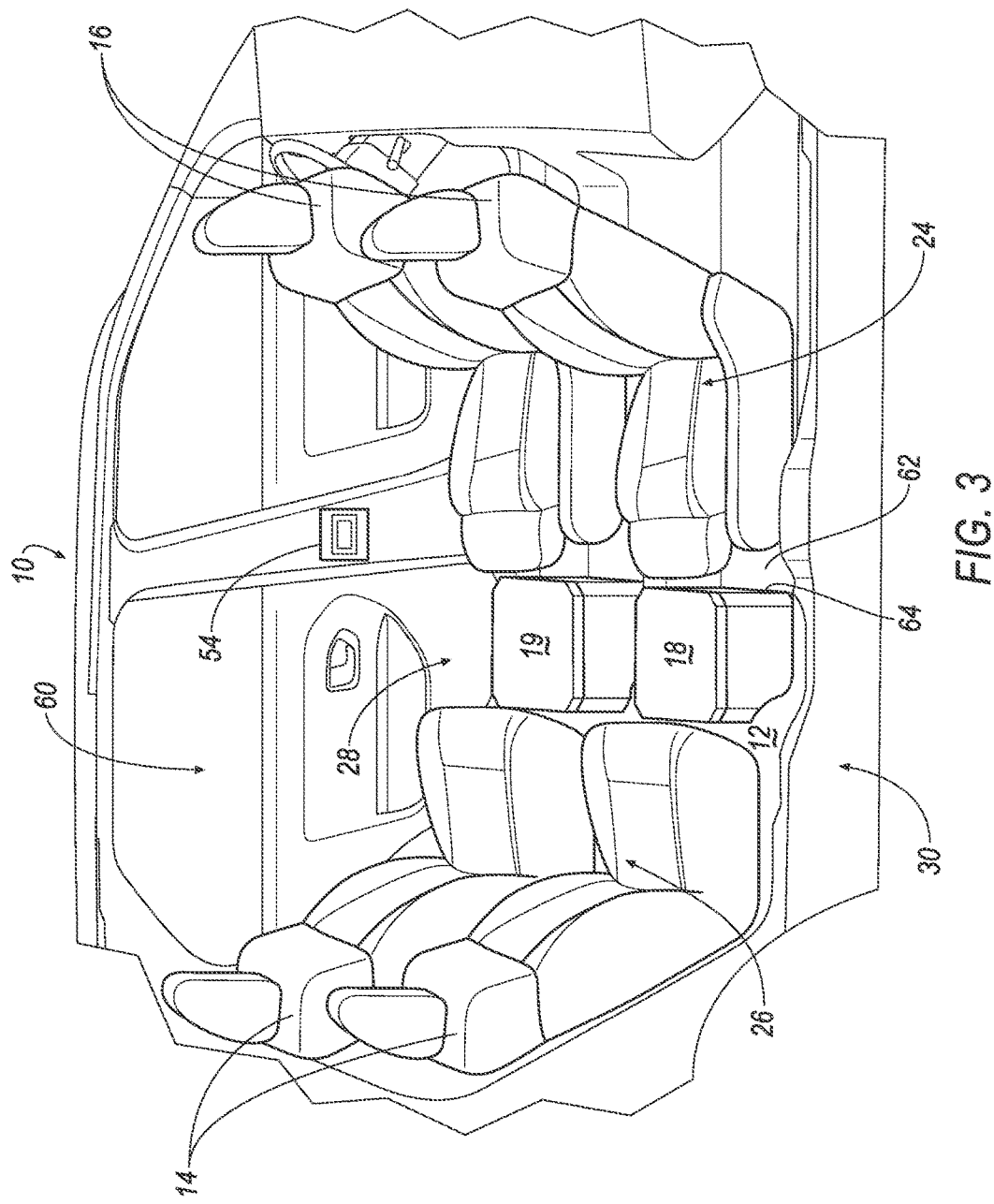
FIG. 3 is a perspective view of the vehicle with the two inflatable cushions in an inflated position.
Figure 4:
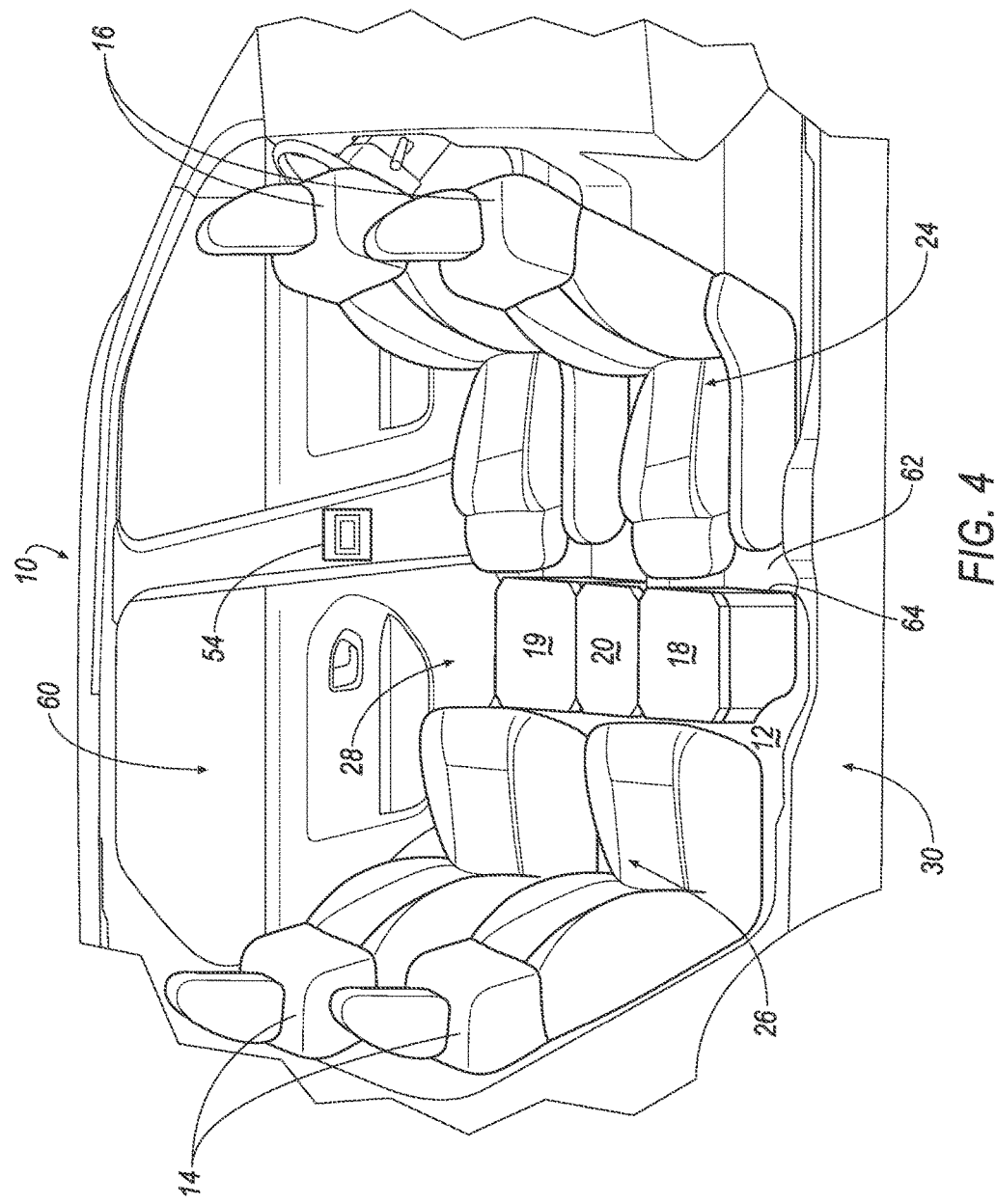
FIG. 4 is a perspective view of the vehicle including three inflatable cushions in the inflated position.

As set forth further below, the vehicle 10 may include any suitable number of inflatable cushions 18, 19, 20, e.g., one, two (as shown in FIGS. 1-3), three (as shown in FIG. 4), etc. For example, the vehicle 10 may include a first inflatable cushion 18 and a second inflatable cushion 19 spaced from each other, as shown in FIGS. 1-4. As another example, the vehicle 10 may include a third inflatable cushion 20 extending from the first inflatable cushion 18 to a second inflatable cushion 19, as shown in FIG. 4. As set forth further below, the inflatable cushions 18, 19, 20 may be selectively movable from a deflated position, as shown in FIGS. 1 and 2, to an inflated position, as shown in FIGS. 3 and 4. The adjectives "first," "second," and "third," are used herein as identifiers and are do not signify order or importance.

The vehicle 10 may be an autonomous vehicle. In other words, the vehicle 10 may be autonomously operated such that the vehicle 10 may be driven without constant attention from a driver, i.e., the vehicle 10 may be self-driving without human input.

With reference to FIGS. 1-4, the vehicle 10 may include a front row 24 of front seats 16 spaced from a rear row 26 of rear seats 14. A rear passenger compartment 60 may be disposed between the front row 24 and the rear row 26. The vehicle 10 may include any suitable number of seats in each row 24, 26, and may include any suitable number of rows of seats, and the inflatable cushion 18, 19, 20 may be disposed between any one or more of the rows of seats.

With reference to FIG. 1, the vehicle 10 may include a left interior side 28 and a right interior side 30 spaced from each other in a cross-vehicle direction, i.e., in a direction transverse to a direction of movement of the vehicle 10. The vehicle 10 may include a left door 32 at the left interior side 28, and a right door 34 at the right interior side 30. The front row 24 of front seats 16 and the rear row 26 of rear seats 14 may each extend from the left interior side 28 to the right interior side 30. The rear passenger compartment 60 may extend from the left interior side 28 to the right interior side 30 from the front row 24 to the rear row 26.

With reference to FIGS. 1-4, the floor 12 of the vehicle 10 may extend between the left interior side 28 and the right interior side 30. The floor 12 of the vehicle 10 may be formed of any suitable material, e.g., steel, aluminum, etc.

As shown in FIGS. 1-4, the front row 24 and the rear row 26 are supported on the floor 12 of the vehicle 10. Specifically, as shown in FIG. 2, the front seats 16 may swivel relative to the floor 12 between the first position and the second position, as set forth above. In other words, the front seats 16 may each be rotatable about a respective axis transverse to the floor 12. The floor 12 may include suitable mounts for mounting the front seats 16 and the rear seats 14 to the floor 12.

As set forth above, the inflatable cushion 18, 19, 20 is supported on the floor 12 of the vehicle 10. The floor 12 may include suitable mounts for mounting the inflatable cushion 18, 19, 20 to the floor 12.

As shown in FIGS. 1-4, the floor 12 may define a depression 36 between each front seat 16 and rear seat 14. One of the inflatable cushions 18, 19, 20 may be disposed in each depression 36. With continued reference to FIGS. 1-4, the floor 12 may define a tunnel 38 disposed along a longitudinal axis of the vehicle 10. The tunnel 38 may separate the depressions 36. At least one of the inflatable cushions 18, 19, 20 may be disposed on the tunnel 38, as shown in FIG. 4.

The floor 12 of the vehicle 10 may include floor trim 62. The floor trim 62 may include plastic, carpet, etc.

Figure 5:
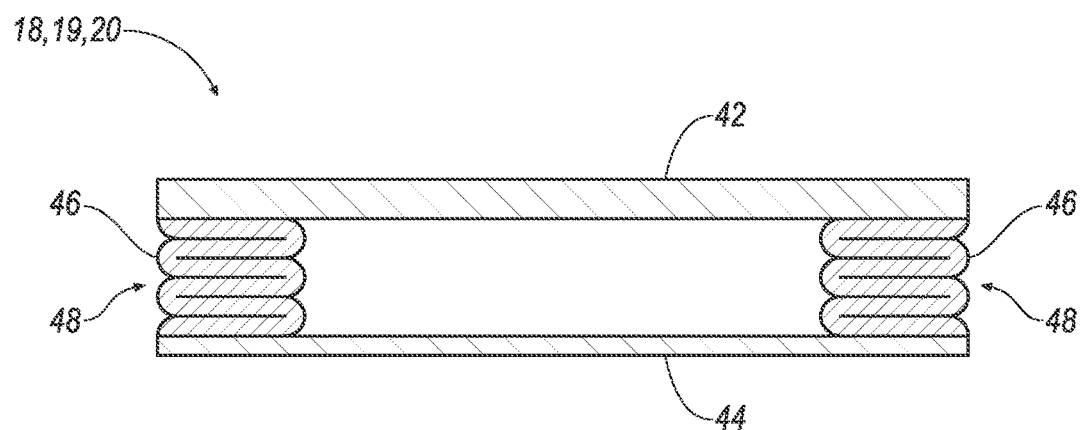
FIG. 5 is a cross-sectional view of one of the inflatable cushions in the deflated position.

As shown in FIG. 5, the inflatable cushions 18, 19, 20 may each include an upper panel 42, a lower panel 44, and sides 46 extending from the upper panel 42 to the lower panel 44 defining an inflation chamber therebetween. The upper panel 42, lower panel 44, and sides 46 may be sealed such that the inflatable cushion 18, 19, 20 is airtight. The upper panel 42, the lower panel 44, and the sides 46 may be integral, i.e., formed simultaneously as a single continuous unit. Alternatively, the upper panel 42, the lower panel 44, and the sides 46 may be formed separately and subsequently attached, e.g., by welding, adhering, etc.

As shown in FIG. 5, the upper panel 42 may be thicker than the sides 46. The relative thickness of the upper panels 42 may support the occupant during use of the inflatable cushions 18, 19, 20 as a footrest or bed, and may increase resistance to impact, puncture, etc.

The lower panel 44 may be fixed to the floor 12 of the vehicle 10. As set forth above, the floor 12 may include mounts (not shown), and the lower panel 44 may engage the mounts. The lower panel 44 may include clips (not shown) or other features for engaging the floor 12.

As shown in FIG. 5, the sides 46 may have pleats 48 that are folded in the deflated position. The pleats 48 are unfolded in the inflated position. The pleats 48 may guide the inflatable cushion 18, 19, 20 from the inflated position to the deflated position. In other words, the pleats 48 may guide the upper panel 42 to a predetermined retracted position as the inflatable cushion 18, 19, 20 is deflated from the inflated position to the deflated position.

The upper panels 42 of the inflatable cushions 18, 19, 20 may be flush with the floor trim 62 when the inflatable cushions 18, 19, 20 are in the deflated position. In other words, the floor trim 62 may extend generally in a plane and, in the deflated position, the upper panels 42 of the inflatable cushions 18, 19, 20 may be in a common plane with the floor trim 62. As such, the inflatable cushions 18, 19, 20 may blend, e.g., visually, with the floor trim 62. Therefore, the upper panels 42 may serve as at least part of the floor trim 62 when the inflatable cushions 18, 19, 20 are in the deflated position, as shown in FIGS. 1 and 2. The floor trim 62 may, for example, include cutouts 64 that receive the inflatable cushions 18, 19, 20 such that the upper panels 42 are flush with the floor trim 62 in the deflated position.

The inflatable cushion 18, 19, 20 may be of any suitable shape. For example, the inflatable cushion 18, 19, 20 may have a rectangular box shape, as shown in the figures.

The inflatable cushion 18, 19, 20 may be formed of any suitable polymeric material, e.g., polyvinyl chloride, urethane rubber, etc. As other examples, the inflatable cushion 18, 19, 20 may have both thermoplastic and elastomeric properties, e.g., a thermoplastic elastomer (TPE). A suitable class of TPE material for the inflatable cushion 18, 19, 20 may be, for example, thermoplastic olefin (TPO), etc. The inflatable cushion 18, 19, 20, e.g., the upper panel 42 and/or the sides 46, may be covered with fabric, vinyl, or other upholstery.

The pressure control device 22 may include an air pump in fluid communication with the inflation chamber of the inflatable cushion 18, 19, 20. The pressure control device 22, e.g., the air pump, may be configured to pressurize the inflation chamber of the inflatable cushion 18, 19, 20 to move the inflatable cushion 18, 19, 20 to the inflated position, and to draw a vacuum from the inflatable cushion 18, 19, 20 to move the inflatable cushion 18, 19, 20 to the deflated position. In other words, the pressure control device 22, e.g., the air pump, may be reversible, e.g., may both provide inflation to and draw vacuum from the inflation chamber. The pressure control device 22 may be disposed at any suitable location, e.g., on the floor 12 below the floor trim 62 and/or below one of the front seats 16 and rear seats 14.

The pressure control device 22 may independently inflate the first inflatable cushion 18, the second inflatable cushion 19, and the third inflatable cushion 20. With reference to the embodiment shown in FIGS. 1-3 with the first inflatable cushion 18 and the second inflatable cushion 19, for example, the pressure control device 22 may be connected to each of the first inflatable cushion 18 and the second inflatable cushion 19 and may independently control the inflation pressure of the first inflatable cushion 18 and the second inflatable cushion 19, e.g., with a valve (not shown). Alternatively, for example, the vehicle 10 may include two pressure control devices 22 dedicated to the inflation and/or deflation of the first inflatable cushion 18 and the second inflatable cushion 19, respectively.

As another example, with reference to the embodiment shown in FIG. 4 including the third inflatable cushion 20, the pressure control device 22 may be connected to the first inflatable cushion 18, the second inflatable cushion 19, and the third inflatable cushion 20, and may be independently control the inflation pressure of the first inflatable cushion 18, the second inflatable cushion 19, and the third inflatable cushion 20, e.g., with one or more valves (not shown). Alternatively, for example, the vehicle 10 may include three pressure control devices 22 dedicated to the inflation and/or deflation of the first inflatable cushion 18, the second inflatable cushion 19, and the third inflatable cushion 20, respectively.

Figure 6A:
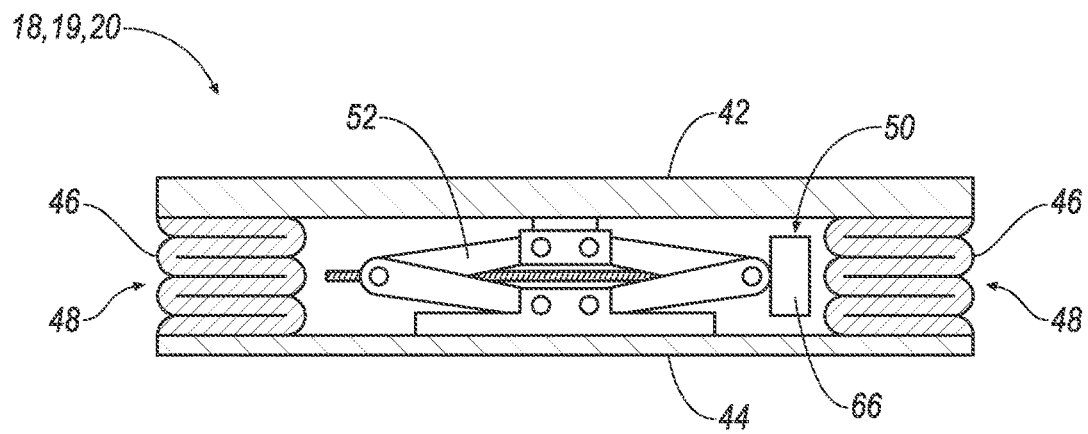
FIG. 6A is a cross-sectional view of one of the inflatable cushions in the deflated position and including a retracting device.
Figure 6B:
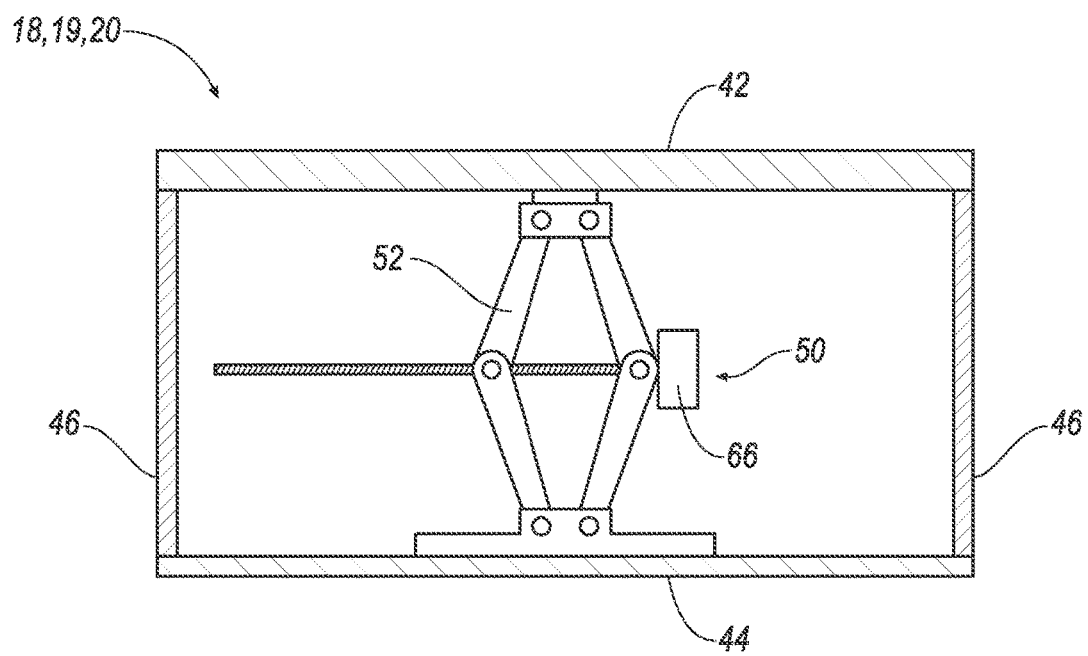
FIG. 6B is a cross-sectional view of the inflatable cushion of FIG. 6A in the inflated position.

The inflatable cushion 18, 19, 20 may include a retracting device 50 for retracting the upper panel 42 and the sides 46 from the inflated position to the deflated position. The retracting device 50 may include a mechanism and a motor 66 for pulling the upper panel 42 and/or the sides 46 toward the lower panel 44. The retracting device 50 may be coupled to at least one of the side and the upper panel 42. For example, the retracting device 50 may be, for example, a scissor jack 52 coupled to the upper panel 42, as shown in FIG. 6A-B.

As set forth above, the vehicle 10 may include two inflatable cushions 18, 19, as shown in FIGS. 1-3, or three inflatable cushions 18, 19, 20, as shown in FIG. 4. Alternatively, the vehicle 10 may include any suitable number of inflatable cushions 18, 19, 20, i.e., one or more. In the example, shown in FIGS. 1-3, the first inflatable cushion 18 and the second inflatable cushion 19 may be spaced from each other in both the inflated position and the deflated position. In this instance, the first inflatable cushion 18 and the second inflatable cushion 19 may be used as footrests.

In the example shown in FIG. 4, the third inflatable cushion 20 may be disposed between and may abut the first inflatable cushion 18 and the second inflatable cushion 19. In this instance, the inflatable cushions 18, 19, 20 extend across the rear passenger compartment 60 in the cross-vehicle direction. In other words, the inflatable cushions 18, 19, 20 may extend from the left interior side 28 to the right interior side 30 of the vehicle 10, e.g., from the left door 32 to the right door 34. Specifically, the upper panels 42 are adjacent each other and positioned to extend continuously from the left interior side 28 to the right interior side 30. The upper panels 42 may be in a common upper plane in the inflated position and in a common lower plane in the deflated position. In this configuration, the inflatable cushions 18, 19, 20 may be used as a bed.

Figure 7:
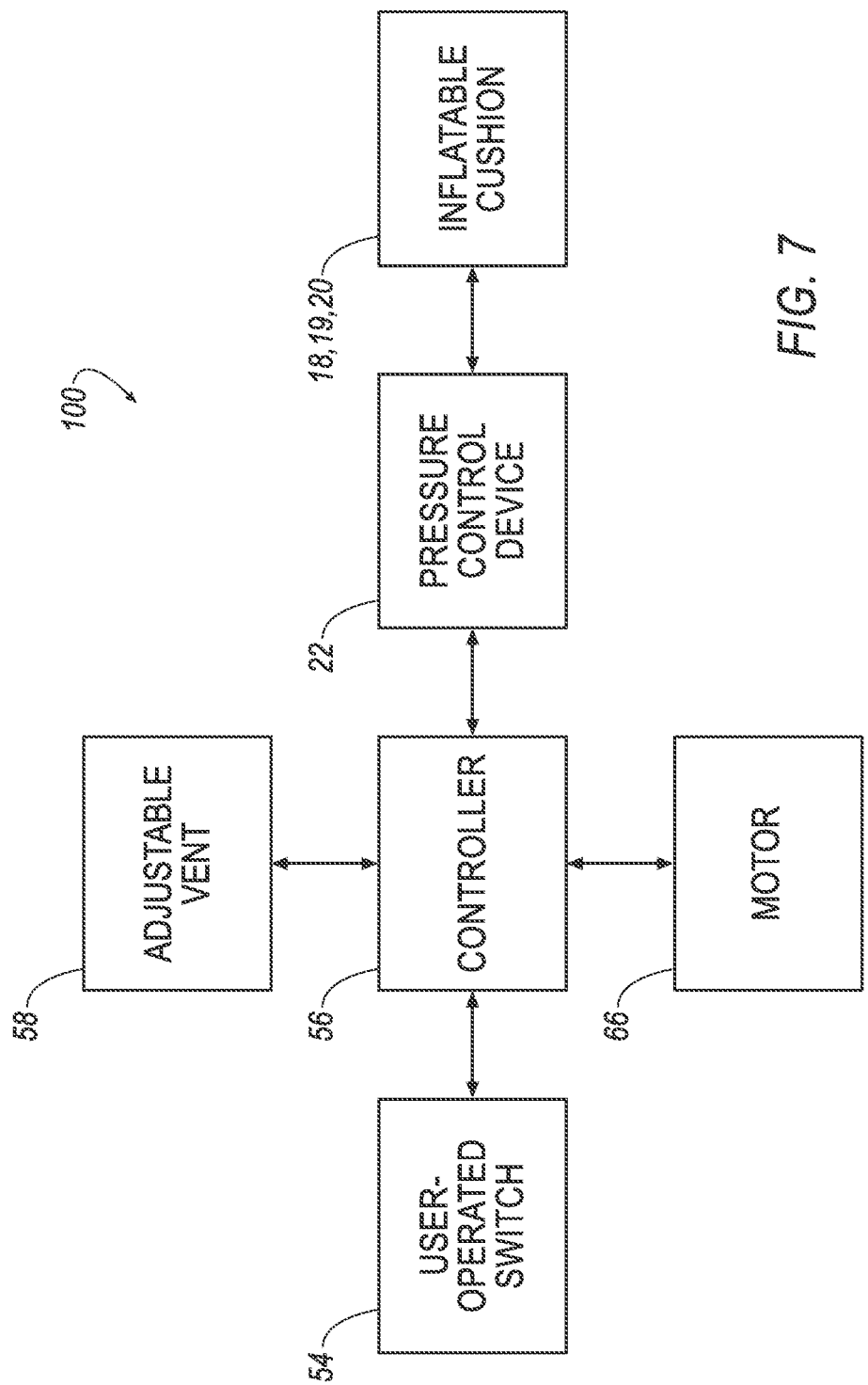
FIG. 7 is a schematic of a control system of the vehicle.

With reference to FIG. 7, the vehicle 10 may include a control system 100 for operating the inflatable cushions 18, 19, 20. The vehicle 10 may include a user-operated switch and a controller 56 in communication with the user-operated switch 54. The user-operated switch 54 may be located in any suitable location, e.g., a center console, a dash, a headliner, etc. The occupant may provide input to the user-operated switch 54, e.g., manual input by hand, to move the inflatable cushions 18, 19, 20 between the inflated position and the uninflated position. The controller 56 may be in communication with the pressure control device 22 and may be programmed to instruct the pressure control device 22 to inflate and deflate the inflatable cushions 18, 19, 20 in response to the input to the user-operated switch 54.

With reference to FIG. 7, each inflatable cushion 18, 19, 20 may include an adjustable vent 58 in communication with the inflation chamber. The vent 58 may be located on the upper panel 42, the lower panel 44, and/or the sides 46. The vent 58 may be closed to seal the inflation chamber to allow the inflatable cushion 18, 19, 20 to be inflated to the inflated position. The vent 58 may be opened to open the inflation chamber to allow the inflation cushion 18, 19, 20 to be deflated to the deflated position.

The controller 56 may be in communication with the adjustable vent 58 and/or the retracting device 50. For example, the controller 56 may be programmed to instruct the adjustable vent 58 to open in response to input from the user-operated switch 54 to move the inflatable cushion 18, 19, 20 to the deflated position. As another example, the controller 56 may be programmed to instruct the retracting device 50 to retract the upper panel 42 and the sides 46 toward the lower panel 44 in response to input from the user-operated switch 54 to move the inflatable cushion 18, 19, 20 to the deflated position.

The controller 56 may be connected to a communication bus, such as a controller area network (CAN) bus (not shown), of the vehicle 10. The controller 56 may be a microprocessor-based controller.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a floor;
a rear seat and a front seat rotatable relative to the rear seat from a first position facing toward the rear seat to a second position facing away from the rear seat;
an inflatable cushion supported by the floor between the front seat and the rear seat;
a second inflatable cushion supported by the floor;
a third inflatable cushion disposed between and abutting the inflatable cushion and the second inflatable cushion; and
at least one pressure control device in communication with the inflatable cushion, the second inflatable cushion, and the third inflatable cushion;
wherein the inflatable cushion, the second inflatable cushion, and the third inflatable cushion each include an upper panel;
wherein the inflatable cushion, the second inflatable cushion, and the third inflatable cushion are selectively movable between a deflated position and an inflated position;
wherein the upper panels of the inflatable cushion, the second inflatable cushion, and the third inflatable cushion are in a common upper plane in the inflated position and configured to be a bed.

2. The vehicle as set forth in claim 1, further comprising a user-operated switch and a controller in communication with the user-operated switch and the pressure control device, the controller being to inflate and deflate the inflatable cushion in response to user input to the switch.

3. The vehicle as set forth in claim 1, wherein the inflatable cushion, the second inflatable cushion, and the third inflatable cushion are independently inflatable.

4. The vehicle as set forth in claim 1, further comprising a user-operated switch and a controller in communication with the user-operated switch and the pressure control device, the controller being programmed to independently inflate and deflate the inflatable cushion, the second inflatable cushion, and the third inflatable cushion in response to user input to the switch.

5. The vehicle as set forth in claim 1, further comprising a floor trim supported by the floor and extending along the common lower plane.

6. The vehicle as set forth in claim 1, wherein the inflatable cushion the second inflatable cushion, and the third inflatable cushion each includes sides extending from the respective upper panel toward the floor, wherein the upper panels are thicker than the sides.

7. The vehicle as set forth in claim 6, wherein the sides have pleats that are folded in the deflated position and are unfolded in the inflated position.

8. The vehicle as set forth in claim 1, wherein the inflatable cushion includes a side and a retracting device coupled to at least one of the side and the upper panel of the inflatable cushion.

9. The vehicle as set forth in claim 1, wherein the pressure control device is configured to pressurize the inflatable cushion to move the inflatable cushion to an inflated position and to draw a vacuum from the inflatable cushion to move the inflatable cushion to a deflated position.

10. The vehicle as set forth in claim 1, wherein the pressure control device includes an air pump in fluid communication with the inflatable cushion.

11. The vehicle as set forth in claim 1, further comprising:
a left interior side and a right interior side spaced from each other in a cross-vehicle direction;

a front row of seats, including the front seat, and a rear row of seats, including the rear seat, spaced from each other defining a rear passenger compartment therebetween from the left interior side to the right interior side; and wherein the inflatable cushion, the second inflatable cushion, and the third inflatable cushion extend substantially across the rear passenger compartment in the cross-vehicle direction from the left interior side to the right interior side.

12. The vehicle as set forth in claim 11, wherein the upper panels of each of the inflatable cushions being adjacent each other and positioned to extend continuously from the left interior side to the right interior side of the vehicle.

13. The vehicle as set forth in claim 12, wherein each of the inflatable cushions are independently inflatable.

14. The vehicle as set forth in claim 11, further comprising a left door on the left interior side, and right door on the right interior side.

15. A vehicle comprising:
a floor;
a rear seat and a front seat rotatable relative to the rear seat from a first position facing toward the rear seat to a second position facing away from the rear seat;
an inflatable cushion supported by the floor between the front seat and the rear seat, the inflatable cushion including an upper panel, and lower panel, and sides extending from the upper panel toward the floor; and
at least one pressure control device in communication with the inflatable cushion; and
a retracting device coupled to at least one of the side and the upper panel, the retracting device including a mechanism and a motor for pulling the upper panel toward the lower panel.

16. The vehicle as set forth in claim 15, wherein the inflatable cushion has an inflation chamber in communication with the pressure control device, and wherein the retracting device is in the inflation chamber.

17. The vehicle as set forth in claim 15, wherein the retracting device is a scissor jack coupled to the upper panel.

* * * * *